June 20, 1933.                    M. HANDLER                    1,914,915
                               SEEDING IMPLEMENT
                      Filed June 8, 1932        2 Sheets-Sheet 1
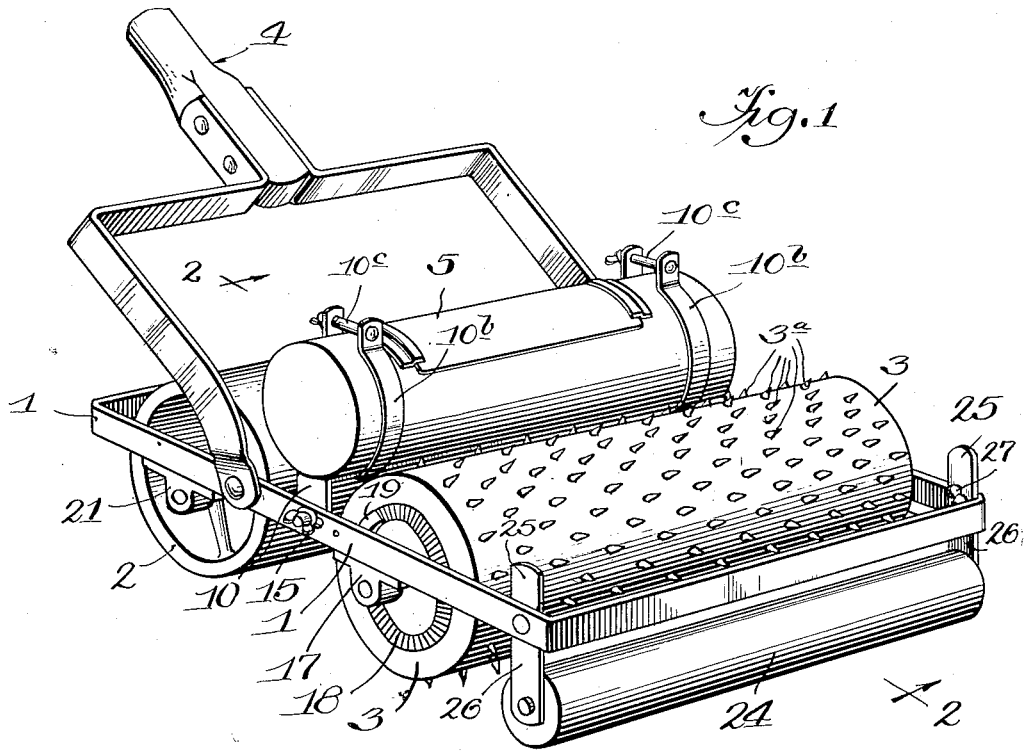
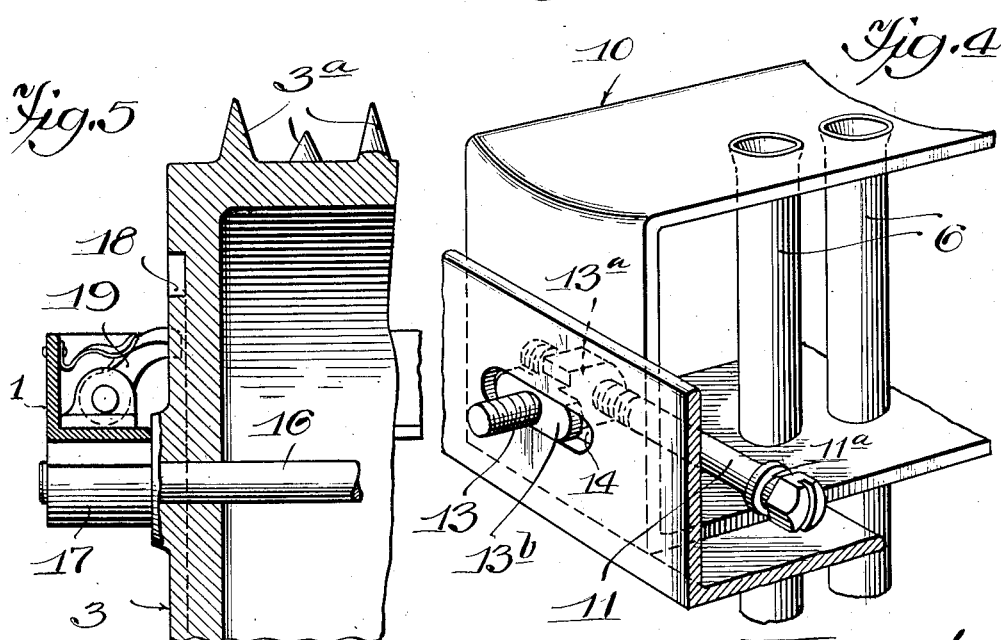

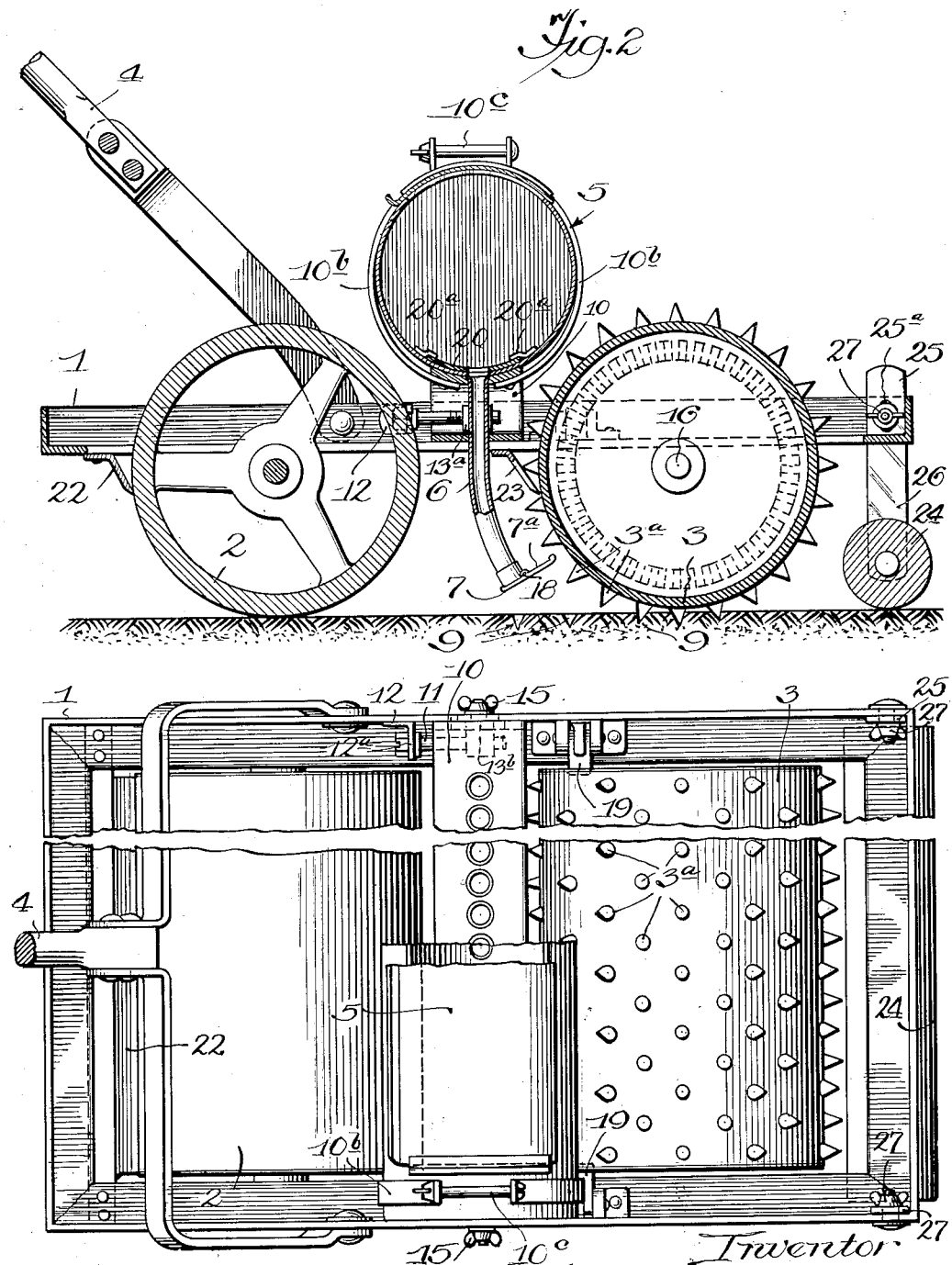

Patented June 20, 1933

1,914,915

UNITED STATES PATENT OFFICE

MORRIS HANDLER, OF CHICAGO, ILLINOIS

SEEDING IMPLEMENT

Application filed June 8, 1932. Serial No. 615,961.

This invention relates to improvements in seeding implements, and more particularly to an implement for domestic use for seeding lawns and other grassed areas.

The object of the invention is to provide an implement which will sow seed economically and effectively, and simultaneously prepare the ground surface to receive the seed and thus insure proper conditions for rapid germination and growth.

A further object of the invention is to provide a seeding implement of simple and rugged construction without complicated mechanisms and adjustments requiring constant attention and expense to keep in repair.

The novel features of the seeding implement are illustrated in the accompanying drawings, in which Figure 1 is a general view in perspective of the implement;

Figure 2 is a view in vertical longitudinal section through the implement as taken on line 2—2 of Figure 1;

Figure 3 is a top plan view of the implement;

Figure 4 is an enlarged detail view of the seed box mounting and adjustment; and Figure 5 is an enlarged detail view in vertical section through one end of the spiked roller showing the pawl and ratchet.

The seeding implement resembles somewhat the ordinary lawn mower in general appearance and mode of manipulation, being preferably propelled by hand, although it can be motor driven if desired. In general, the implement consists of a horizontal rectangular frame 1 supporting a heavy smooth-faced roller 2 at its rear end, and a lighter and preferably hollow roller 3 with a spiked surface at its forward end. The two rollers are of about the same diameter, say 8 or 10 inches, and a length of 24 inches, it being understood that the implement may be made in different sizes. A handle 4 pivotally attached to the frame is used for pushing the implement over the ground in much the same manner as a lawn mower, although for reasons presently to be pointed out, the spiked roller is journalled on the frame so that it revolves only when the implement is being moved forwardly, being locked by a suitable pawl and ratchet device against rotation in the opposite direction. Above and between the two rollers is mounted a seed box 5 of suitable shape and capacity. Along the bottom of the seed box is a row of depending tubular chutes 6 terminating a short distance above the ground surface and just to the rear of the spiked roller 3, the ends of the tubes being normally closed by spring actuated gates 7 seating over the ends of the chutes.

The spikes 3ª on the surface of the roller 3 are perhaps an inch in length and are of a conical shape tapering to pointed ends. Again, the spikes are grouped in circumferential rows throughout the length of the roller, the spikes of each group being spaced apart at uniform distances, while the rows themselves are disposed in alternately staggered relation, so that the arrangement of the spikes longitudinally of the roller consists of transverse rows made up of spikes from alternate circumferential rows. Now, there are the same number of seed chutes 6 as there are circumferential rows or groups of spikes 3ª on the roller 3, there being a tube directly behind and in line with its associated rows of spikes, so that assuming each row of spikes produces a row of holes in the ground surface as the implement is propelled forwardly, the seed delivered from each chute falls in the line of the holes. But as a practical matter, the control of the seed delivery is more accurately gauged than merely dropping the seed along the line of the holes or cavities formed by the spikes, since the gates are so operated as to deposit predetermined amounts of seed into the holes, allowing, of course, for a slight scattering that may occur.

The arrangement which permits of this method of sowing is one whereby the gates 7 are momentarily and intermittently opened by each of the spikes striking a lever arm 7ª projecting from each gate into the path of its associated circular row of spikes. Thus as clearly shown in Figure 2, the lower end portions of the feed tubes 6 are bent slightly toward the roller 3 to bring them more nearly into tangential relation to the path of the spikes, and the end of each tube is cut obliquely so that it opens in a half forward direction. Each gate member 7 is hinged at a point on the edge of the opening nearest the path of the spikes, as at 8, each hinge including a suitable spring which acts to normally hold the gate over the opening, the arm 7ª thus projecting toward the roller and in a slightly upward direction into the path of the row of spikes. Thus assuming the implement to be moving forwardly, the roller 3 will revolve in a clockwise direction, and as the tip of each spike strikes the arm 7ª of the gate 7, the latter will open momentarily allowing a small quantity of seed to be discharged. Now, the spikes are so spaced with relation to each other and the discharge end of the seed chutes, that the seed drops into the hole 9 made by the spike that actuates the gate, although this is not essential so long as the intermittent opening of the gate is so timed as to deposit the required amount of seed into each hole made by the spikes.

It follows then, that the volume of seed discharged intermittently, is controlled primarily by the period of time and extent the gate is open, assuming that each chute is always kept filled by gravity from the seed box 5 above. Thus if the gate is just "ticked", so to speak, by the tips of the spikes, the extent and duration of the gate opening will be quite small and the amount of seed delivered proportionally so, but if a greater length of the spike strikes the arm of the gate, the extent and duration of opening will be increased, and the amount of seed delivered with each opening may be increased. Hence provision is made for controlling the delivery of seed by adjustably mounting the seed box on the implement frame so that it can be shifted bodily toward and from the spiked roller to thereby gauge the contact between the spikes and the gates of the seed chutes, as will presently be described in detail.

Now referring to the construction of the implement in greater detail, the frame is preferably square or rectangular and made up of side and end members of L-section arranged with a web projecting horizontally inward. Extending crosswise of the frame and resting at its ends on the inwardly projecting flanges of the side frame members is saddle-like support 10 for the seed box 5 consisting of a strip of sheet metal bent into the form of a flat loop with square ends and a transversely concave seat 10ª for the bottom of the seed box which is preferably of a cylindric shape with a lid 5ª on top for filling purposes. Straps 10ᵇ with adjusting bolts 10ᶜ are attached to the supporting member 10 and encircle the ends of the seed box.

Located on the frame just rearwardly of each end of the seed box supporting member 10 are adjusting screws or studs 11 for the latter, said studs being anchored in L-shaped brackets 12, 12 bolted or welded to the inner face of the frame members and having a bifurcated web projecting inwardly at right angles to the frame engaging a groove 11ª at the head end of each stud (Figure 4). The threaded portion of each stud 11 engages the tapped head 13ª of a special form of bolt 13 which is inserted through each end wall of the seed box supporting member 10 from the inside, and thence through a horizontally elongated slot 14 in the side frame members (Figure 4). A cross bar 13ᵇ integral with the bolt rides in the slot 14 of the frame and prevents the bolt from turning. And finally a wing nut 15 is mounted on the outer threaded end of the bolt to lock it against movement. Thus by loosening the nuts 15 and the bolts 13, 13, and then turning the adjusting stud 11, the seed box 5 with its supporting member 10 may be moved bodily toward or from the spiked roller 3 for the purpose of controlling the feed as heretofore described.

As already stated, the spiked roller 3 is mounted to rotate freely when the implement is propelled forwardly, but to be locked against rotation in the opposite direction, it being now manifest that the spikes striking the lever arms of the gates 7 would prevent its rotation in the reverse direction, if not cause damage to the gates themselves. For this reason the roller is journalled on a shaft 16 mounted in brackets 17, 17 fastened to the side frame members. Cast in one of the end walls of the roller is a ring of radially facing ratchet teeth 18, and on the frame adjacent the same end of the roller is mounted a spring pressed pawl 19 with its end resting lightly upon the ratchet teeth, the contacting portion of the pawl being so shaped as to ride freely over the teeth when the roller is turning in the direction of the forward movement of the implement (clockwise), but instantly locks the roller against rotation in the opposite direction as when the attempt is made to move the implement backwardly.

As shown in Figures 2 and 4, there are openings along the bottom of the seed box which register with the upper ends of the tubular chutes preferably supported by passing them through the seed box support 10 as shown. Also the feed from the seed box into the chutes may be regulated by a valve plate 20 mounted to slide transversely of the line of openings to the chutes, said plate having openings normally registering with the openings in the bottom of the seed box. The valve plate 20 is slidably held in place by lugs 20ª and suitable means for shifting the plate endwise either from within or without the seed box may be provided.

The rear pressure roller 2 is of sufficient weight to press the seed firmly into the holes formed by the spiked roller 3 and to otherwise smooth the surface. Consequently it is considerably heavier than the spiked roller and may be of any suitable construction. For convenience, the pressure roller is journalled at each end in bearing brackets 21, 21 bolted to the frame. A scraper 22 in the form of a blade with a beveled edge is fastened to the frame and extends across the face of the pressure roller to keep it free from accumulations of earth. Similarly the spiked roller is equipped with a scraper blade 23 located at a corresponding position and for the same purpose, although this scraper has the form of a comb to permit the passage of the rows of spikes, the scraping being confined to the areas between.

The handle 4 already mentioned as similar to that used on hand propelled lawn mowers has a yoke 4ª at its lower end portion which straddles the frame and has pivotal connection at its ends with the side frame members.

And lastly, the implement is provided with a small auxiliary roller 24 just forwardly of the spiked roller 3. This roller is journalled between the lower ends of two vertical bars 25 connected together by a cross bar 26ª. The upper ends of the vertical arms are adjustably connected to the frame 1 by means of adjusting bolts 27 passing through longitudinal slots 25ª in the bars 25. This roller in its vertically extended position has a reach sufficient to raise the spiked roller 3 above the ground level, its function being to take the load of the forward end of the implement when the same is being transported from place to place, or otherwise being moved when inoperative. This auxiliary roller can also be used to limit the depth of the holes made by the spikes by adjusting the roller supporting bars to the height necessary to elevate the spiked roller relative to the ground level.

It is quite apparent that the implement is operated by pushing it over the ground to be seeded, traversing the surface in parallel or circuitous paths in much the same manner as a lawn mower is operated. The amount of seed to be spread or sown is adjusted to the particular requirements, with the result that it is not spread haphazardly over the surface, but in relatively small amounts deposited in holes to be thereafter pressed in, partially covered at least by the weight of the pressure roller. This method of seeding, regarded as the most effective and economical, can be carried on with little effort, and large areas can be seeded with uniform and certain results incapable of being obtained by hand seeding or with other types of mechanical seeders.

Thus having disclosed a preferred embodiment of my invention,

I claim:

1. A seeding implement comprising a roller having pointed projections on its surface adapted to form small holes in a predetermined pattern in the ground over which the implement is propelled, a seed receptacle having a series of chutes terminating adjacent the roller and in alignment with groups of circumferentially arranged projections thereon, hinged gate members mounted at the ends of said chutes and operative intermittently by contact with said projections to open in an amount to deposit a predetermined quantity of seed in each hole, and means for adjusting the contact between said projections and gate members to vary the quantity of seed discharged with each opening of the gate members.

2. A seeding implement comprising a frame, a roller journalled on said frame and having pointed projections on its surface adapted to form holes arranged in a predetermined pattern in the ground over which the implement is propelled, a seed receptacle mounted on said frame rearwardly of said roller and having a series of chutes terminating rearwardly of said roller and in alignment with groups of circumferentially arranged projections on said roller, closure members mounted at the ends of said chutes and actuated by contact with said projections, and means for shifting said seed receptacle on said frame to adjust the position of the contact portions of said closure members relative to said projections to regulate the quantity of seed discharged with each opening thereof.

3. A seeding implement comprising a frame, a roller journalled on said frame and having pointed projections arranged in circumferential groups on its surface and adapted to form holes in the ground being seeded, a seed receptacle mounted on said frame and provided with a plurality of chutes terminating behind the roller and having their lower ends in alignment with the rows of holes made by said projections, closure members normally closing said chutes and having portions extending into the paths of said projections, to be intermittently opened and closed thereby to effect the depositing of a predetermined amount of seed in each hole, and means for adjusting said chutes relative to said roller to vary the degree of opening of said closure members.

4. A seeding implement comprising a frame, a pair of rollers arranged in tandem on said frame, the forward roller having pointed projections systematically distributed in circumferential groups adapted to form holes in the ground being seeded, a seed receptacle provided with a plurality of chutes terminating behind the advanced roller and having their lower ends in alignment with the rows of holes made by said projections, gate members normally closing said chutes and operative by contact with said projections to deposit a predetermined amount of seed in each of said holes, and means for adjusting said chutes to vary the interval of opening of said gate members.

Signed at Chicago, Illinois, this 14th day of May, A. D. 1932.

MORRIS HANDLER.